United States Patent [19]

DeAngelis

[11] Patent Number: 4,876,227
[45] Date of Patent: Oct. 24, 1989

[54] REACTION SINTERED BORIDE-OXIDE-SILICON NITRIDE FOR CERAMIC CUTTING TOOLS

[75] Inventor: Thomas P. DeAngelis, Big Flats, N.Y.

[73] Assignee: Corning Incorporated, Corning, N.Y.

[21] Appl. No.: 235,977

[22] Filed: Aug. 24, 1988

Related U.S. Application Data

[63] Continuation of Ser. No. 886,925, Jul. 18, 1986, abandoned, which is a continuation-in-part of Ser. No. 853,897, Apr. 21, 1986, abandoned.

[51] Int. Cl.$^4$ .............................................. C04B 35/58
[52] U.S. Cl. ........................................ 501/97; 501/98; 51/309
[58] Field of Search ................ 501/96, 97, 98; 51/309

[56] References Cited

U.S. PATENT DOCUMENTS 4,650,498  3/1987  Buljan ................................... 51/309
4,748,138  5/1988  Watanabe et al. .................... 501/87

FOREIGN PATENT DOCUMENTS 58-64272   4/1983   Japan .................................... 501/97
58-64273   4/1983   Japan .................................... 501/97
59-223272  12/1984  Japan .

Primary Examiner—Mark L. Bell
Attorney, Agent, or Firm—Clinton S. Janes, Jr.; Richard N. Wardell; Charles Q. Buckwalter, Jr.

[57] ABSTRACT

This invention is directed to the production of oxide-boride-silicon nitride ceramics consisting essentially of ceramic bodies of oxide and boride phases which have silicon nitride added to improve the properties of the ceramic body for use as wear material, durable interface material, and cutting tool inserts. The addition of $Si_3N_4$ to the oxide-boride body provides a durable ceramic material which provides a range of cutting speeds that may be utilized in both turning and milling operations.

16 Claims, No Drawings

REACTION SINTERED BORIDE-OXIDE-SILICON NITRIDE FOR CERAMIC CUTTING TOOLS

This application is a continuation of application Ser. No. 886,925, filed July 18, 1986, now abandoned, which is a continuation-in-part of application Ser. No. 853,897, filed Apr. 21, 1986, now abandoned.

BACKGROUND OF THE INVENTION

The field of the invention is oxide-boride-silicon nitride ceramics where addition of silicon nitride to the boride/oxide phases eliminates cracking during formation of the body and increases wear resistance and impact shock resistance for use as a durable wear material, interfacing material and as a cutting tool insert.

Historically, cutting tool inserts were fashioned from metals. As higher speeds of cutting (>500 surface feet per minute, (sfm)) were achieved, metals proved less than satisfactory due to their tendency to chemically react with the workpiece. Nitride, carbide, and oxide coatings were applied to cutting tool metal inserts, however, this improvement is a function of the integrity of the metal coating and eventually wears to the metal substrate.

Generally, cutting tool inserts are function and/or workpiece specific. Inserts for turning are not used as milling inserts and vice versa. The technologies have tended toward dichotomization with ceramic turning tool insert compositions varying significantly from milling tool insert compositions. The ceramic tool milling inserts have been based in the $Si_3N_4$ technology while ceramic tool turning inserts have been based in the $Al_2O_3$ technology. Herein, the marriage of these technologies produces a ceramic tool insert which exhibits surprising durability characteristics for use as either a turning or milling tool insert.

The following prior art exposes the extent of the ceramic turning and milling tool insert dichotomy. Typical ceramic turning tool insert compositions have been a sintered $Al_2O_3$ body with various modifiers being added to increase durability and hardness. U.S. Pat. No. 4,063,908 discloses the addition of $TiO_2$ and TiC to the $Al_2O_3$ sintered ceramic body.

U.S. Pat. No. 4,204,873 discloses the addition of WC and TiN to the $Al_2O_3$ sintered ceramic body. U.S. Pat. No. 4,366,254 discloses the addition of $ZrO_2$, TiN or TiC, and rare earth metal carbides to the $Al_2O_3$ ceramic body. U.S. Pat. No. 4,543,343 discloses addition of $TiB_2$ and $ZrO_2$ to the $Al_2O_3$ ceramic body.

U.S. Pat. No. 3,843,375 departed from the $Al_2O_3$ ceramic body disclosing an admixture of TaN and $ZrB_2$ as the sintered ceramic body.

Typical ceramic milling tool inserts are a $Si_3N_4$ sintered ceramic body modified with various metal oxides. U.S. Pat. No. 4,434,238 discloses a $Si_3N_4$ body modified with $SiO_2$ and $Y_2O_3$. U.S. Pat. No. 4,264,548 discloses a $Si_3N_4$ body modified with $SiO_2$, $Y_2O_3$, and $Al_2O_3$.

Generally, there are two tests performed on cutting tool insert material to screen their potential for insert use. These are the turning test and the milling test (or shock test). The turning test looks to durability and is a function of the cutting speed measured in surface feet per minute (sfm). Typically, cutting speeds for the industry average 500 sfm. The milling test looks to the toughness of the material and is measured by the number of cuts as a function of flank wear. The advantage of ceramic inserts is their durability and availability of use at much higher surface feet per minute, an order of magnitude larger. The disadvantage has been low reliability since ceramic materials have tended to chip due to insert tip fracture.

There is, therefore, a need to develop ceramic substrates which exhibit a greater degree of toughness to overcome the reputation for unreliability and a ceramic composition which is capable of embracing both turning and milling functions.

SUMMARY OF THE INVENTION

It is an object of this invention to provide a product or body which substantially overcomes the aforesaid limitations of the prior art in providing ceramic bodies of oxide and boride phases which have silicon nitride added to improve the properties of the ceramic body for product use as a cutting tool insert.

The invention utilizes, but is not limited to, the process known as Exchange Reaction Hot Pressing (ERHP) as disclosed in European patent application publication No. 0115689 issued Aug. 15, 1984. It is previously known that diluents, modifiers, and fillers could be added to the ERHP reactions. The novel discovery is that addition of silicon nitride to the oxide-boride phases helps to eliminate cracking during formation of the body and increases wear and impact shock resistance of cutting tool insert material which yields a cutting tool insert with superior performance.

The invention is a ceramic body which is characterized by uniformly fine-grained and intimately interdispersed phases of oxides, borides, silicon nitrides, and/or silicon-aluminum oxynitrides. Furthermore, the invention is a ceramic composition consisting essentially of a dense homogeneous sintered body whose composition is selected from (a) composition A consisting essentially of on a mole per cent basis, 2 to 80% silicon nitride, where some or all of the silicon nitride is present as a separate phase or in solid solution with aluminum oxide as silicon-aluminum-oxynitride and about 10 to 90% boride phase or phases of one or more of the elements of groups 3b including lanthanide and actinide series elements, 4b, 5b, 6b, and 25 to 88% oxide phases or phases of one or more of the elements of groups 3a, 4a, 3b including lanthanide and actinide series elements, 4b, 5b, 6b and 8 of the periodic table; and mixtures of any of the foregoing and (b) composition B consisting essentially of a dense homogeneous sintered body consisting essentially on a mole percent basis, of 5 to 63% silicon nitride, where some or all of the silicon nitride is present as a separate phase or in solid solution or with aluminum oxide as silicon-aluminum-oxynitride and about 37 to 95% boride phase or phases of one or more of the elements of group 3b including lanthanide and actinide series elements, 4b, 5b, 6b, and 0 to 25% oxide phases or phases of one or more of the elements of groups 3a, 4a, 3b including lanthanide and actinide series elements 4b, 5b, 6b, and 8 of the periodic table; and mixtures of the foregoing. The reaction hot pressed body of this invention is noted for virtual absence of open porosity, toughness, and hardness for wear resistance, elimination of cracking during body formation, and impact shock resistance. It is also notable that these valuable properties can be attained by heating the mixture of reactants to temperature not greater than about 1600° C. and without need for any grain growth inhibitor or sintering aid.

An advantageous form of the invention is a reaction sintered oxide-boride-silicon nitride ceramic body consisting essentially of a fine-grained, homogeneous, intimate interdispersion of:

(a) 2-80 mole % silicon nitride where some or all of the silicon nitride is present as a separate phase or in solid solution as silicon-aluminum-oxynitride, and (b) 10-90 mole % boride phase or phases of one or more of the elements of groups 3b including lanthanide and actinide series elements, 4b, 5b, 6b, and (c) 0-88 mole % oxide phase or phases of one or more of the elements of groups 3a, 4a, 3b including lanthanide and actinide series elements, 4b, 5b, 6b and 8; which body is prepared by the process comprising;

(d) admixing particulate reactants of maximum particle size substantially (e.g. at least 95 volume percent) not greater than 150 μm and being elements, compounds, intermetallic compounds, alloys or combination thereof in stoichiometric proportions to substantially form the boride, and oxide phases, and (e) shaping and heating the admixture to form the reaction sintered body, the heating being done in nonreactive atmosphere and at temperature at which the reaction and sintering occurs between the reactants to substantially form the boride and oxide phases.

Reaction sintering involves the dual effects of reaction between and sintering together of the admixed reactants at temperature causing the reaction to occur and be substantially completed. It is to be understood that the reaction as in the ERHP process proceeds stepwise, the reactants forming products which then automatically sinter. It may be effected at atmospheric, subatmospheric, or superatmospheric pressure. The latter condition involves the substantially simultaneous shaping and heating steps of hot pressing to produce a body of the invention with very little or no open porosity and highest strength properties, although some preliminary separate pressing or heating of the reactant admixture may be advantageously done. Where open porosity is desired in an otherwise tough and hard body of the invention, the separate heating step at atmospheric or subatmospheric pressure may be employed sequentially following the shaping step.

A unique advantage of the ERHP process is that fine grained ceramic materials are produced independent of the particle size of the reactant powders. The grain sizes of the grains in the reacted body are not dependent on and are generally much smaller than the particles of the reacting powder. The maximum grain size of any product phase should not be substantially greater than 15 μm and preferably not substantially greater than 5 μm. This fine grain microstructure contributes significantly to the excellent mechanical and physical properties of the ERHP materials. A body formed by conventional ceramic processing requires smaller reactant particle grain sizes to achieve comparable ERHP product grain sizes. Generally, grain growth is exhibited during and is a result of the sintering process. Therefore, to achieve small grain products, smaller grained reactants are required.

The body of the invention may contain, as part of the boride, oxide, and/or silicon nitride phases, diluent which is a nonreacted portion of the reactant admixture as a stoichiometric excess amount of a reactant and/or as a boride or oxide according to the aforesaid invention definition but different from the reactants.

Silicon nitride does not "react" as do the other batch reactants but does go into solid solution with the aluminum oxide or remains as a separate phase. This solid solution can consist of one or more phases of that class of materials known as silicon-aluminum-oxynitrides (SiAlONs).

Generally, the element forming the boride cation is different than the element forming the oxide cation. Nonreacting phases, such as aluminum oxide, can be added to the reactants as nonreacting filler materials.

Alternatively, cutting tools of the present invention may be formed by hot pressing in accordance with conventional techniques. These ceramic compositions provide excellent wear resistance with commercially acceptable toughness. Significantly these compositions perform well in both the wear and shock tests indicating their broad applicability as reliable ceramic tool inserts for both turning and milling operations. Furthermore, while the compositions presented offer the bifunctional role, the ERHP process which is the preferred method of making these compositions provides a relatively easy pathway to an end product which can be finished to the required size and shape.

It is important to increase the reliability of ceramic materials as cutting tool inserts to defeat the reputation earned since their initial use. The present invention provides long lived materials which are functional in both tool insert operations and provide the operator with a range of working speeds and work piece cutting depths that heretofore, ceramic materials have been unable to achieve. Speeds ranging from a low of 500 sfm to a high of 5000 sfm may be utilized with the current compositions. These compositions have also shown superior cutting performance for hard and soft steels and cast iron.

To illustrate the improved milling and turning characteristics of the present invention the following examples are provided. Although most examples presented were a product of the ERHP process it is not relied upon as the only method to the inventive composition since conventional techniques are available as a pathway to the claimed compositions.

Shown in Table 1 are the ceramic compositions tested as inserts.

TABLE 1

| Sample | Wt. % $TiB_2$ | Wt. % $Al_2O_3$ | Wt. % $Si_3N_4$ |
|---|---|---|---|
| A | 50 | 15 | 35 |
| B | 95 | 0 | 5 |
| C | 65 | 0 | 35 |
| D | 50 | 0 | 50 |
| E | 45 | 20 | 35 |
| F | 25 | 40 | 35 |
| G | 55 | 40 | 5 |
| H | 15 | 10 | 75 |
| I | 49 | 46 | 5 |
| J | 46 | 44 | 10 |
| K | 38 | 37 | 25 |
| L | 36 | 34 | 30 |
| M | 33 | 32 | 35 |
| N | 31 | 29 | 40 |
| O | 26 | 24 | 50 |
| P | 13 | 12 | 75 |
| Q | 28 | 37 | 35 |
| R | 23 | 42 | 35 |
| S | 13 | 52 | 35 |
| T | 28 | 67 | 5 |
| U | 30 | 60 | 10 |
| V | 20 | 30 | 50 |
| W | 13 | 83 | 4 |
| X | 33 | 32 | 35 |

The range of compositions tested were as follows: $TiB_2$ ranged from 13 to 95 wt. %, in combination with or exclusive of $Al_2O_3$ which ranged from 0 to 83 wt. %, and in combination with $Si_3N_4$ which ranged from 4 to 75 wt. %.

Physical properties were measured on a range of compositions to determine the hardness. Hardness is estimated on the Rockwell Hardness scale. Table 2 shows representative values of the range of measured properties. Typically densities on the order of 3.4 g/cm$^3$ have been reported and Rockwell Hardness values ranging from 87 to 91 for $Si_3N_4$ containing ceramic insert tools. Densities for the current compositions range from 3.28 to 3.95 g/cm$^3$. Rockwell Hardness A values measured in the range of 90.6 to 94.2. All samples evidenced very low open porosity. The product material should have a maximum open porosity substantially not greater than 5% and a preferred open porisity substantially not greater than 2%.

TABLE 2

| Sample | Density g/cm$^3$ | Open Porosity, % | Rockwell Hardness A |
|---|---|---|---|
| B | 3.92 | <1 | 90.8 |
| C | 3.40 | 1.6 | 91.9 |
| D | 3.44 | <1 | 94.2 |
| E | 3.67 | <1 | 93.4 |
| F | 3.56 | <1 | 93.2 |
| G | 3.95 |  | 90.6 |
| H | 3.28 | <1 | 91.2 |
| W | 3.95 | <1 | 93.7 |

Most samples tested were made by the Exchange Reaction Hot Pressing (ERHP) process. Bodies comprising essentially boride/oxide/silicon nitride are produced by adding silicon nitride powder to the reactant powder mixture used to make the boride/oxide phases. For example, the following powders were intimately mixed in the appropriate proportions:

$$Si_3N_4 + TiO_2 + AlB_{12} + Al$$

by suitable means such as vibramilling. In one embodiment of this process the mixed powder is then charged to a graphite mold and heated under pressure (hot pressed) to a temperature sufficient to cause the exothermic reaction of the $TiO_2 + AlB_{12} + Al$ wherein the formation and densification of the final product phases occur. The resulting body consists of the following phases: $TiB_2$, $Al_2O_3$, $Si_3N_4$ (alpha and beta), SiAlON phases, and may contain trace amounts (<5 wt. %) of TiN, unreacted reactants, silicates, nitrogen mullite, silicon, and aluminum borates. The phases formed are a function of the purity of the reactants, the processing temperature, the amount of $Si_3N_4$ added and the amount and kind of diluents added to the reaction. Silicon nitride does not "react" as do the other batch reactants but does go into solid solution with the aluminum oxide. This solid solution can consist of one or more phases of SiAlONS.

The following procedure is representative of the ERHP process and samples were tested under the given conditions.

Sample A

Sample A was prepared according to the following equation:

35% $Si_3N_4$ + 65% ($6TiO_2 + AlB_{12} + 7Al$) → 35% $Si_3N_4$ + 65% ($6TiB_2 + 4Al_2O_3$).

$Si_3N_4$ (with a Mean Particle Size (MPS) of 2.1 microns), $TiO_2$ (with an MPS <1 micron), $AlB_{12}$ (with an MPS of 9.4 microns), and Al (with an MPS of 6.4 microns) were mixed in a slurry of isopropanol. The slurry was vibramilled using 0.5 inch diameter alumina grinding media for 16 hours. The slurry was dried and a portion of the powder hot pressed in a graphite mold in vacuum at a maximum hold temperature of 1600° C. and top pressure of 6000 psi. The sample was held at maximum temperature and pressure for 30 minutes.

Once made and formed into a cutting tool insert samples were subjected to the turning and milling tests.

The compositions were subjected to a turning test under the following conditions: insert geometry: SNG-433, edge preparation: T2, material: 4150 steel, depth of cut: 0.075 inches, cutting speed 850 sfm, and a lead angle: 15°. The results are listed in Table 3.

TABLE 3

| Sample | Total Cutting Time in Minutes | Flank wear in inches | Feed rate inch per Revolutions |
|---|---|---|---|
| I | 10.06 | .0105 | .015 |
| K | 8.86 | .0105 | .015 |
| M | 6.17 | .0115 | .015 |
| O | 4.67 | .012 | .015 |
| R | 13.3 | .0065 | .015 |
| S | 10.2 | .011 | .015 |
| T | 24.4 | .010 | .010 |
| U | 15.8 | .010 | .010 |

The results for most compositions are comparable or better than that reported in the prior art. Table 4 shows data on different materials and cutting speeds which illustrates the range of potential use of the inventive compositions.

TABLE 4

| Sample | Material | Cutting Speed sfm | Total Cutting Time in minutes | Flank Wear in inches | Depth of cut in inches | Feed rate in inches per revolution |
|---|---|---|---|---|---|---|
| A | 4340 Steel | 900 | 6.3 | .016 | .050 | .005 |
| A | Class 30 Gray Iron BHN 180 | 3000 | 8.5 | .015 | .050 | .010 |

As table 4 indicates the $Si_3N_4$, $Al_2O_3$, $TiB_2$ material is capable of use on workpieces of varying hardness and higher cutting speeds and exhibits excellent wear resistance. These inserts had not reached the failure point prior to the conclusion of the test.

The unique facet of these compositions is their dual use as a turning and milling material. Table 5 shows the results of the milling test. The materials tested were made by the ERHP process and subject to the shock test under the following conditions: cutting speed: 1200 sfm, depth of cut: 0.075 inches, feed rate: 0.0025 inches increased by 0.0025 inches on each 5th cut, edge preparation: T2 and a lead angle of 15°. The workpiece was cast iron, 200 BHN.

TABLE 5

| Sample | Total Cutting Time min. | Flank Wear in inches | Failure at Cut No. |
|---|---|---|---|
| I | 16.5 | .008 | 21 |
| J | 14.7 | .007 | 16 |
| K | 16.2 | .007 | 19 |
| L | 19.2 | .008 | 31 |
| M | 19.2 | .008 | 31 |

TABLE 5-continued

| Sample | Total Cutting Time min. | Flank Wear in inches | Failure at Cut No. |
|---|---|---|---|
| N | 19.2 | .007 | 31 |
| O | 19.2 | .007 | 31 |
| P | 16.9 | .006 | 21 |
| Q | 16.9 | .006 | 21 |
| R | 16.8 | .006 | 21 |
| S | 18.6 | .007 | 28 |
| V | 19.6 | .008 | 32 |

Sample X is of a composition not made by the ERHP process but by hot pressing. A mixture of 35 wt. % $Si_3N_4$, 33 wt. % $TiB_2$, and 32 wt. % $Al_2O_3$ was vibramilled in isopropanol using alumina balls for 16 hours. After vibramilled the solvent was evaporated. Part of the powder mixture was hot pressed in a POCO graphite mold applying full pressure of 6000 psi at the start and maintaining the pressure throughout the cycle. The sample was heated at 27° C. per minute up to 1600° C. and held at temperature for 30 minutes, then cooled at furnace rate. The resulting bulk density was 3.50 g/cm$^3$.

This sample X lasted for 31 cuts in the shock test at 1200 sfm and for 2.5 minutes in the turning test at 2000 sfm. This indicates that the compositions are not ERHP process biased.

Combining the results of the turning and milling tests indicates the preferred embodiment of the inventive composition to be useful as a ceramic cutting tool insert for the combinational use as a milling and turning tool insert. The preferred combination comprises 10 to 70 mole % $TiB_2$, 1 to 70 mole % $Al_2O_3$, and 5 to 55 mole % of $Si_3N_4$. The data further indicate that the following two compositional ranges for each constituent exhibit preferred compositional combinations comprising mole % as: 10 to 55% and 12 to 35% $TiB_2$, 5 to 50% and 5 to 40% $Si_3N_4$, as well as 25 to 70% and 28 to 70% $Al_2O_3$. These compositional ranges focus on the optimum ranges for use of these combinations as both turning and milling ceramic inserts. As well, these ranges exhibit properties of toughness and hardness which encompass the functional capability for milling and turning which may be applied to a range of workpiece materials.

I claim:

1. A ceramic composition consisting essentially of a dense homogeneous sintered body whose composition is selected from:
    (a) composition A consisting essentially of a dense homogeneous sintered body consisting on a mole percent basis, of 2 to 53% silicon nitride, where some or all of the silicon nitride is present as a separate phase or in solid solution with aluminum oxide as silicon-aluminum-oxynitride, and about 10 to 61% boride phase or phases of one or both of the elements Ti and Zr, and 37 to 88% oxide phase or phases of one or more of the elements of groups 3a, 4a, 3b, including lanthanide and actinide series elements, 4b, 5b, 6b and 8 of the periodic chart; and mixtures of any of the foregoing, or
    (b) composition B consisting essentially of a dense homogeneous sintered body consisting, on a mole percent basis, of 5 to 48% silicon nitride, where some or all of the silicon nitride is present as a separate phase or in solid solution with aluminum oxide as silicon-aluminum-oxynitride, and about 37 to 80% boride phase or phases of one or both of the elements Ti and Zr, and 15 to 25% oxide phase or phases of one or more of the elements of groups 3a, 4a, 3b, including lanthanide and actinide series elements, 5b, 6b, and 8 of the periodic table; and mixtures of the foregoing.

2. The composition as defined in claim 1 wherein the selected composition is composition A.

3. The composition as defined in claim 1 wherein the selected composition is composition B.

4. The composition as defined in claim 2 containing about 5 to 53% silicon nitride.

5. The composition as defined in claim 2 containing about 5 to 50% silicon nitride.

6. The composition as defined in claim 2 containing about 5 to 40% silicon nitride.

7. The composition as defined in claim 2 containing about 10 to 61% titanium diboride.

8. The composition as defined in claim 2 containing about 10 to 55% titanium diboride.

9. The composition as defined in claim 2 containing about 12 to 35% titanium diboride.

10. The composition as defined in claim 2 containing about 37 to 70% alumina.

11. A ceramic insert cutting tool with a composition as defined in claim 1.

12. A reaction sintered oxide-boride-silicon nitride ceramic body as in claim 1 consisting essentially of a fine-grained, homogeneous, intimate interdispersion which body is prepared by the process comprising:
    (a) admixing particulate reactants of maximum particle size substantially (e.g. at least 95 volume percent) not greater than 150 μm and being elements, compounds, intermetallic compounds, alloys or combination thereof in stoichiometric proportions to substantially form the boride and oxide phases, and
    (b) shaping and heating the admixture to form the reaction sintered body, and heating being done in nonreactive atmosphere and at temperature at which the reaction and sintering occurs between the reactants to substantially form the boride and oxide phases.

13. The composition as defined in claim 1 having not greater than 5% open porosity.

14. The composition as defined in claim 1 having not greater than 2% open porosity.

15. The composition as defined in claim 1 having a maximum grain size of any product substantially not greater than 15 μm.

16. The composition as defined in claim 1 having a maximum grain size of any product substantially not greater than 5 μm.

* * * * *